(12) United States Patent
Gudem et al.

(10) Patent No.: US 9,882,602 B2
(45) Date of Patent: Jan. 30, 2018

(54) GLOBAL NAVIGATION SATELLITE SYSTEM RECEIVER WITH FILTER BYPASS MODE FOR IMPROVED SENSITIVITY

(75) Inventors: Prasad Srinivasa Siva Gudem, San Diego, CA (US); Liang Zhao, Sunnyvale, CA (US); I-Hsiang Lin, Los Altos, CA (US); Zhijie Xiong, San Jose, CA (US); Bhushan Shanti Asuri, San Diego, CA (US); Aristotele Hadjichristos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 13/172,653

(22) Filed: Jun. 29, 2011

(65) Prior Publication Data

US 2013/0003783 A1    Jan. 3, 2013

(51) Int. Cl.
*H04B 1/3805* (2015.01)
*H04B 1/525* (2015.01)

(52) U.S. Cl.
CPC ........... *H04B 1/525* (2013.01); *H04B 1/3805* (2013.01)

(58) Field of Classification Search
CPC .... H04B 1/1027; H04B 1/1036; H04B 1/109; H04B 1/3805; H04B 1/525; H04B 15/02; H04W 88/06; G01S 19/21; G01S 19/36
USPC .................................................. 375/346, 349
See application file for complete search history.

(56) References Cited

U.S. PATENT DOCUMENTS

| | | | |
|---|---|---|---|
| 6,442,375 B1 * | 8/2002 | Parmentier | ..... 455/78 |
| 6,630,862 B1 * | 10/2003 | Perthold et al. | ..... 330/149 |
| 6,809,775 B2 | 10/2004 | Yule | |
| 6,987,950 B2 | 1/2006 | Coan | |
| 6,999,027 B1 * | 2/2006 | Stockmaster | ..... 342/357.29 |
| 7,444,166 B2 * | 10/2008 | Sahota | ..... H04B 7/0802 455/140 |

(Continued)

FOREIGN PATENT DOCUMENTS

| | | |
|---|---|---|
| CN | 1681216 A | 10/2005 |
| CN | 101228458 A | 7/2008 |

(Continued)

OTHER PUBLICATIONS

Myung-Woon Hwang et al., "A High IIP2 Direct-Conversion Receiver Using Even-Harmonic Reduction Technique for Cellular CDMA/PCS/GPS Applications," Circuits and Systems I: Regular Papers, IEEE Transactions on vol. 55 , Issue: 9; Publication Year: 2008 , pp. 2934-2943.

(Continued)

*Primary Examiner* — David B. Lugo
(74) *Attorney, Agent, or Firm* — Hunter Clark PLLC (57) ABSTRACT

A global navigation satellite system receiver with filter bypass mode for improved sensitivity is disclosed. In an aspect, an apparatus is provided that includes a non-bypass signal path coupled to a receiver, the non-bypass signal path comprising a filter. The apparatus also includes a bypass signal path coupled to the receiver, the bypass signal path configure to bypass the filter, and a switch to couple an antenna to the non-bypass signal path during time intervals when signals transmitted by an unrelated local transmitter are transmitted with a signal power that exceeds a selected threshold, and to couple the antenna to the bypass signal path during other time intervals.

16 Claims, 6 Drawing Sheets

(56) References Cited

U.S. PATENT DOCUMENTS

| | | |
|---|---|---|
| 8,270,927 B2 | 9/2012 | Wallace et al. |
| 2003/0222709 A1* | 12/2003 | Kim ..................... H03F 1/0277 330/51 |
| 2004/0005871 A1* | 1/2004 | Saito et al. .................... 455/287 |
| 2004/0008094 A1* | 1/2004 | Niemi ........................... 333/101 |
| 2004/0018824 A1 | 1/2004 | Fang |
| 2005/0215204 A1* | 9/2005 | Wallace et al. ................. 455/78 |
| 2006/0055594 A1* | 3/2006 | McConnell et al. ....... 342/357.1 |
| 2006/0109939 A1* | 5/2006 | Ciccarelli et al. ............ 375/350 |
| 2006/0178122 A1* | 8/2006 | Srinivasan et al. ........ 455/168.1 |
| 2007/0008215 A1* | 1/2007 | Smith et al. ............. 342/357.02 |
| 2007/0142013 A1 | 6/2007 | Bucknor et al. |
| 2008/0175340 A1* | 7/2008 | Landmark .................... 375/350 |
| 2008/0231512 A1* | 9/2008 | Yeshayahu ................... 342/417 |
| 2009/0298455 A1* | 12/2009 | Takeuchi ................. H03F 1/22 455/296 |
| 2009/0318087 A1* | 12/2009 | Mattila et al. ................ 455/63.1 |
| 2009/0323779 A1 | 12/2009 | Lennen |
| 2010/0019970 A1 | 1/2010 | Farrokhi et al. |
| 2010/0026547 A1* | 2/2010 | Weissman .............. H04B 1/109 342/16 |
| 2010/0303162 A1* | 12/2010 | Wang et al. .................. 375/260 |
| 2012/0195237 A1 | 8/2012 | Chan et al. |
| 2013/0003617 A1 | 1/2013 | Gudem et al. |
| 2013/0065542 A1* | 3/2013 | Proudkii ............ H03H 11/1291 455/78 |

FOREIGN PATENT DOCUMENTS

| | | |
|---|---|---|
| EP | 1916767 | 12/2010 |
| JP | 2006074313 A | 3/2006 |
| JP | 2006261998 A | 9/2006 |
| JP | 2010177954 A | 8/2010 |
| WO | 0106669 A1 | 1/2001 |
| WO | WO-2006055791 A1 | 5/2006 |

OTHER PUBLICATIONS

Winternitz, L.M.B. et al; "A GPS Receiver for High-Altitude Satellite Navigation," Selected Topics in Signal Processing, IEEE Journal of; vol. 3 , Issue: 4; Publication Year: 2009 , pp. 541-556.
International Search Report and Written Opinion—PCT/US2012/045126—ISA/EPO—dated Oct. 22, 2012.

* cited by examiner

GLOBAL NAVIGATION SATELLITE SYSTEM RECEIVER WITH FILTER BYPASS MODE FOR IMPROVED SENSITIVITY

BACKGROUND

Field

The present application relates generally to the operation and design of Global Navigation Satellite Systems (GNSS), and more particularly, to improving the sensitivity of a GNSS receiver.

Background

High quality signal reception is especially important for the current generation of portable devices. Typically, such devices provide multiple services, such as wireless communication services and, for example, position location services that requires the reception of GNSS signals. For example, GNSS comprise a wide range of satellite positioning systems (SPS) that include the Global Positioning System (GPS) used in the United States, the GLObal Navigation Satellite System (GLONASS) used in Russia, the COMPASS navigation system used in China, and other regional positioning systems. Thus, the front end of a wireless receiver needs to be carefully designed to reject interfering signals and receive desired signals with high sensitivity.

To illustrate the problem, consider a GPS coexistence scenario where a portable device includes a GPS receiver and a cellular transmitter. In this GPS coexistence scenario, strong radio frequency signals can appear at the GPS receiver's front-end due to transmission on the cellular channel. Such signals may jam the GPS receiver and thus interfere with GPS signal reception. To address this problem, a band pass filter, such as a surface acoustic wave (SAW) filter, is typically inserted in the receive signal path associate with the GPS receiver. The SAW filter suppresses jamming signals associated with the cellular transmitter but also introduces an insertion loss of approximately 1.5 dB. Thus, at times when there are no jamming signals present, the received GPS signals still experience the insertion loss of the SAW filter thereby reducing receiver sensitivity.

Therefore, it would be desirable to have an efficient way to overcome the insertion loss of filters utilized in a GNSS receiver front end to improve sensitivity.

BRIEF DESCRIPTION OF THE DRAWINGS

The foregoing aspects described herein will become more readily apparent by reference to the following description when taken in conjunction with the accompanying drawings wherein.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
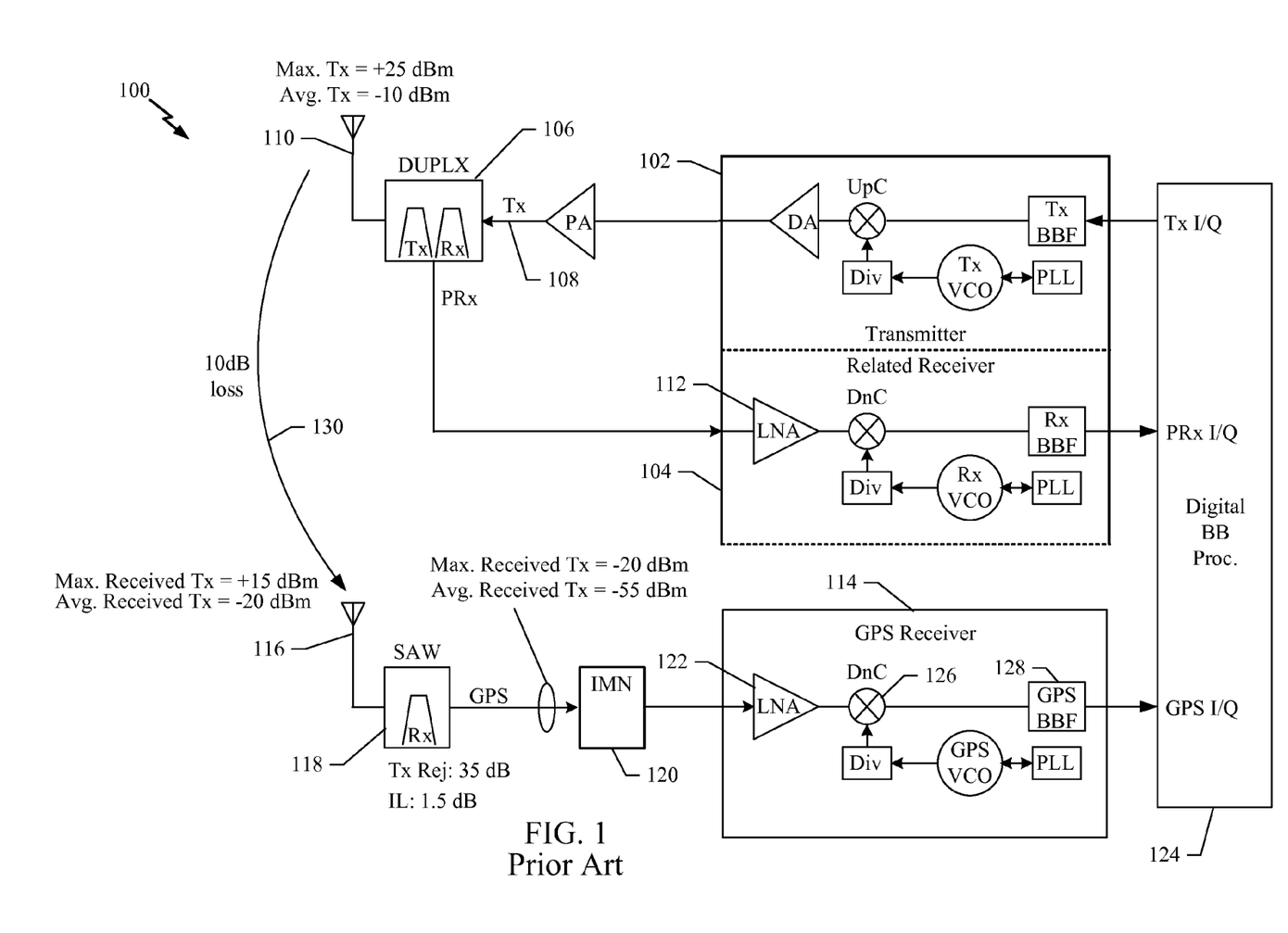
FIG. 1 shows a diagram of a conventional front end of a communication device that includes a GPS receiver.

FIG. 1 shows a diagram of a conventional front end 100 of a communication device that includes a GPS receiver 114. For example, the front end 100 is suitable for use in a portable wireless device, such as a smart phone.

The front end 100 comprises a local transmitter 102 and receiver 104 that transmit and receive voice, data, or other information over a communication network. The transmitter 102 and receiver 104 are considered local because they are located within the same communication device as the GPS receiver 114. The local transmitter 102 and receiver 104 are related in that they operate together to provide bidirectional communications with an external entity using a particular communication protocol. Accordingly, the transmitter 102 is unrelated to the GPS receiver 114 in that they do not operate together to provide bidirectional communications with an external entity using a particular communication protocol.

A duplexer 106 filters and routes a transmit signal 108 from the transmitter 102 to an antenna 110 for transmission. Signals received by the antenna 110 are input to the duplexer 106 where they are filtered and then input to a low noise amplifier (LNA) 112 of the related receiver 104. Thus, the transmitter 102 and the related receiver 104 operate together to communicate with a wireless network using the appropriate network access technology.

The front end 100 also comprises the GPS receiver 114. The GPS receiver 114 utilizes a GPS antenna 116 to receive GPS signals that can be used to determine a precise location. The received GPS signals are input to a band pass filter 118, which comprises a SAW filter, thin film bulk resonator (FBAR) filter, bulk acoustic wave (BAW) filter, or any other type of filter. For purpose of this description, it will be assumed that the band pass filter 118 is a SAW filter and is described hereinafter as "SAW filter 118." The GPS signals are filtered by the SAW filter 118 and then input to an input matching network (IMN) 120 that matches the input impedance of an LNA 122 of the GPS receiver 114. The received GPS signals are amplified by the LNA 122, down converted by down-converter 126, filtered by the BB filter 128 and passed to a digital BB processor 124 where they are used to make accurate position determinations.

The local transmitter 102, related receiver 104, and GPS receiver 114 communicate with the digital baseband (BB) processor 124. The digital BB processor 124 processes information that is transmitted or received over a communication network using the antenna 110. Thus, the processor 124 knows when and at what power level data or other information will be transmitted by the transmitter 102. The digital BB processor 124 also processes baseband signals received from the GPS receiver 114 to make position determinations.

During operation, the transmitter 102 transmits a signal from the antenna 110. The transmitted signal may have a maximum signal power level of approximately +25 dBm and an average signal power level of approximately −10 dBm as indicated. Because the antenna 110 is close to the antenna 116, a signal transmitted with high power from the antenna 116 may couple to the antenna 110 and jams the GPS receiver 114. For example, the signal transmitted from the antenna 110 will experience about 10 dB of loss as it travels (as shown at signal path 130) to the antenna 116 that is utilized by the GPS receiver 114. The transmitted signal will be received at the GPS antenna 116 and may have a maximum signal power level of about +15 dBm. Without the SAW filter 118, a signal received at this level would jam the GPS receiver 114 and interfere with the performance of the digital BB processor 124 to make an accurate position determination.

The SAW filter 118 filters out signals that are outside the GPS signal band, which is centered at approximately 1575 MHz. For example, in one exemplary implementation, the SAW filter 118 provides approximately 35 dB of rejection outside the GPS signal band. This level of rejection reduces the maximum signal power of the received transmitted signal (jammer) by approximately 35 dB so that a maximum signal power level of about −20 dBm is received at an input matching network (IMN) 120 and thereafter the LNA 122. As a result, the LNA 122 receives the transmit signal (jammer) at a power level of about −20 dBm, which is not large enough to jam the GPS receiver 114 or interfere with the operation of the digital BB processor 124 to make accurate position determinations.

Unfortunately, when receiving GPS signals, the SAW filter 118 introduces approximately 1.5 dB of insertion loss (IL). The GPS signals are typically received with a signal power of approximately −160 dBm, and this insertion loss results in lower sensitivity that can affect the performance of the GPS receiver 114 and the operation of the digital BB processor 124 to make accurate position determinations. Accordingly, exemplary embodiments of the disclosed GPS receiver with improved sensitivity operate to reduce or eliminate the signal loss introduced by the SAW filter 118.

In various exemplary aspects, a GNSS receiver with improved sensitivity is disclosed. For the purpose of this description, the various aspects are described herein with reference to a GPS receiver; however, the various aspects are equally applicable to any type of GNSS receiver.

Figure 2:
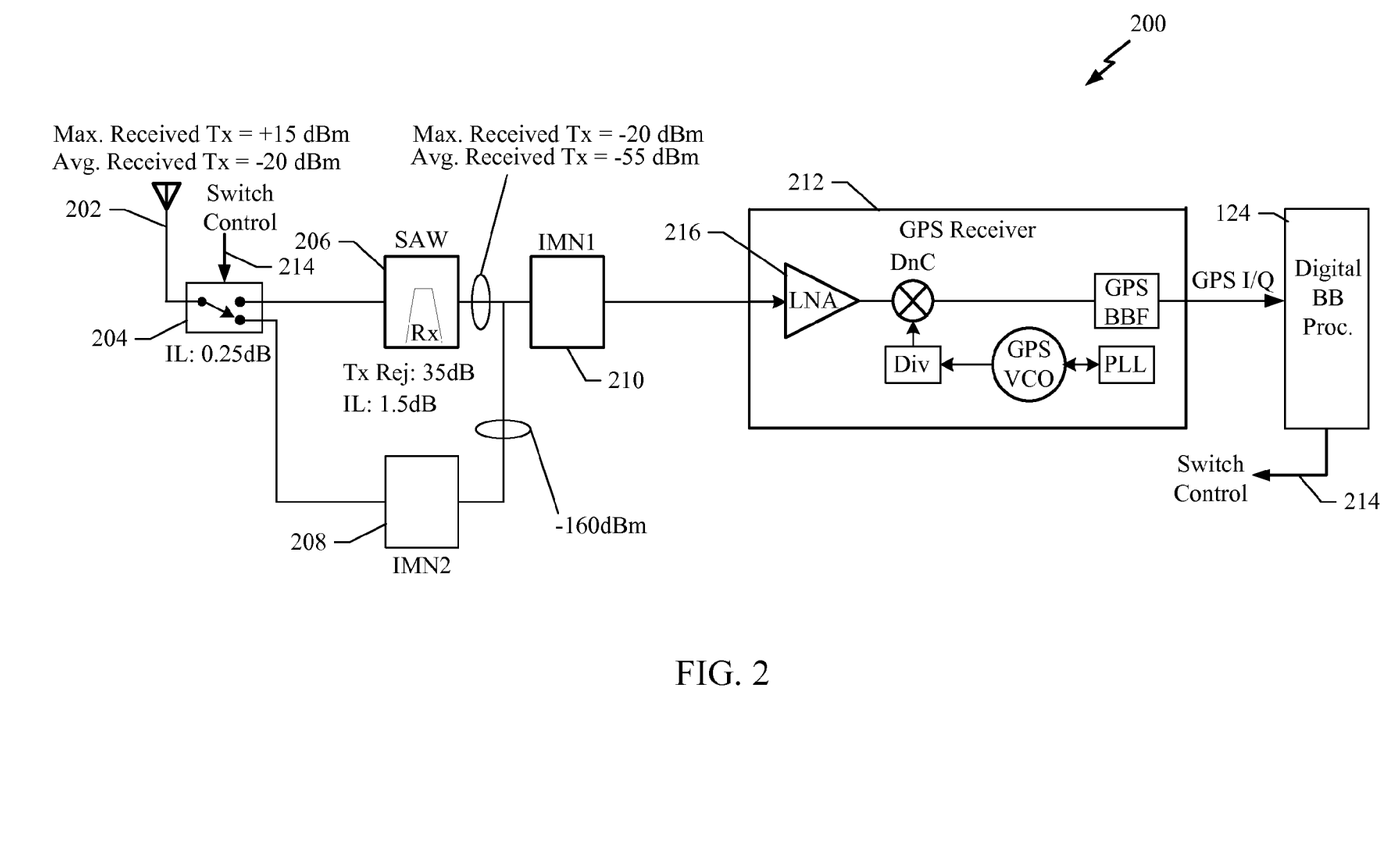
FIG. 2 shows an exemplary front end portion that comprises a GPS receiver configured for improved sensitivity.

FIG. 2 shows an exemplary front end portion 200 that comprises a GPS receiver configured for improved sensitivity. For example, the front end portion 200 is suitable for use in the front end 100 shown in FIG. 1. The front end portion 200 comprises GPS antenna 202, switch 204, SAW filter 206, IMN1 208, IMN2 210, and GPS receiver 212.

The switch 204 comprises any suitable switching device or circuit and operates to selectively connect the antenna 202 to the SAW filter 206 or the IMN2 208 based on a switch control signal 214. The switch 204 inserts about 0.25 dB of insertion loss into the selected signal path.

In one implementation, the digital BB processor 124 outputs the switch control signal 214. The digital BB processor 124 has knowledge about when and at what power level transmissions are to be performed by the transmitter 102. During times when the transmitter 102 is to transmit signals at relatively high signal power, the digital BB processor 124 sets the switch control signal 214 to control the switch 204 to connect the antenna 202 to the SAW filter 206 in a non-bypass operating mode. During times when the transmitter 102 is transmitting signals at relatively low power (i.e., −10 dBm or less) or when the transmitter 102 is not transmitting any signals, the digital BB processor 124 sets the switch control signal 214 to control the switch 204 to connect the antenna 202 to the IMN2 208 in a bypass operating mode. Additional detail about the non-bypass and bypass modes is provided below.

Non-Bypass Mode

During the non-bypass operating mode, the switch control signal 214 controls the switch 204 to connect the antenna 202 to the SAW filter 206 on a non-bypass signal path. This mode of operation can be utilized when an unrelated local transmitter, such as the transmitter 102 is actively transmitting a signal that can jam the GPS receiver 212. For example, assuming that the transmit signal is received at the antenna 202 with a signal level of approximately +15 dBm. The SAW filter 206 provides 35 dB of rejection to attenuate the received maximum transmit signal to about −20 dBm. At this level the received transmit signal (jammer) will not interfere with the operation of the GPS receiver 212. Thus, in the non-bypass operating mode, the received transmit signal (jammer) is significantly suppressed.

Unfortunately, the SAW filter 206 has an insertion loss of about 1.5 dB, which operates to degrade any GPS signals that are received by the antenna 202 during this operating mode. For example, GPS signals are received at the antenna 202 with a signal power of approximately −160 dBm. The switch 204 routes these signals to the SAW filter 206 where the signal loses 1.5 dB due to the insertion loss of the SAW filter 206. As a result, the received GPS signals are received at the LNA 216 with a much lower signal level. Thus, in non-bypass mode, the GPS receiver 216 operates with less sensitivity.

Bypass Mode

In the bypass operating mode, the switch control signal 214 controls the switch 204 to connect the antenna 202 to the IMN2 208 on a bypass signal path. For example, the bypass operating mode is used when the transmitter 102 is not transmitting (i.e., no jammer present) or when the transmitter 102 is transmitting with very low signal power such that any received jamming signal does not cause a significant loss of sensitivity at the GPS receiver 212.

The IMN2 208 performs impedance matching to match the input impedance of the IMN1 210. The output of the IMN1 210 is input to the LNA 216 of the GPS receiver 212. Since in this operating mode, the SAW filter 206 is bypassed (i.e., the received GPS signals are routed around the SAW filter 206), the received GPS signals avoid the insertion loss of the SAW filter 206, and therefore arrive at the GPS receiver 212 with higher signal levels than can be achieved in non-bypass mode. For example, in bypass mode, GPS signals are received at the GPS receiver 212 with a signal power level that is about 1.5 dB higher than in non-bypass mode. It will be assumed in the various implementations that the IMN2 208 and IMN1 210 have very small insertion losses.

Figure 3:
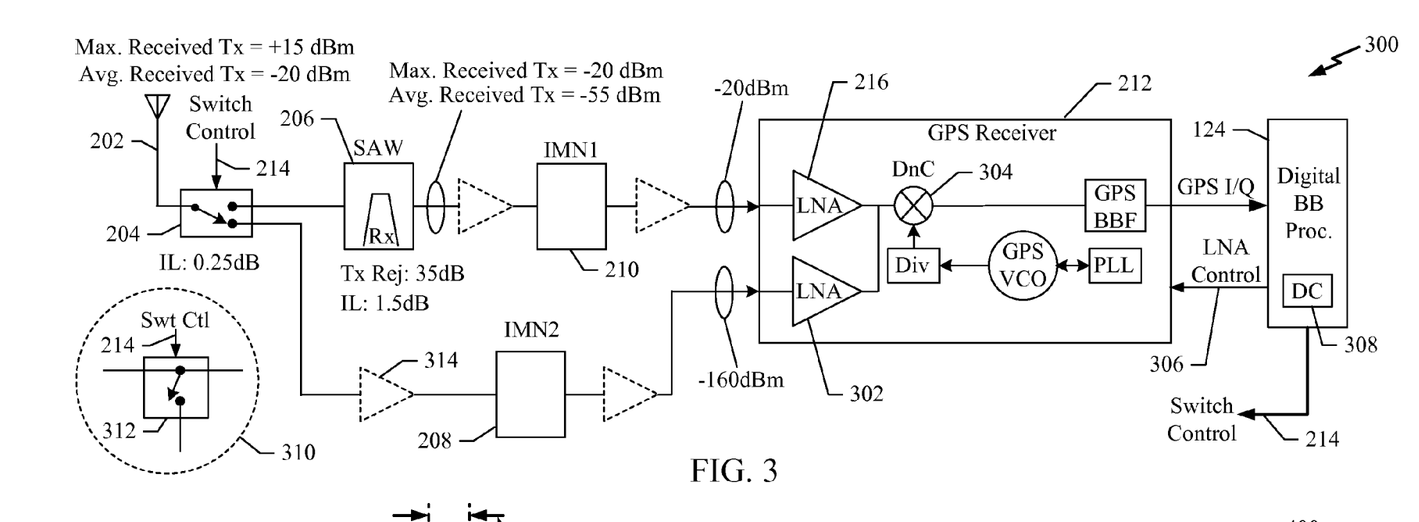
FIG. 3 shows an exemplary front end portion that comprises the front end portion shown in FIG. 2 with several modifications.

FIG. 3 shows an exemplary front end portion 300 that comprises the front end portion 200 shown in FIG. 2 with several modifications. The antenna 202, switch 204, SAW filter 206, IMN2 208, and IMN1 210 operate as described with reference to FIG. 2. The modifications comprise the addition of LNA 302 to the GPS receiver 212. The GPS receiver 212 selectively enables the output of the LNA 216 or the output of the LNA 302 to be connected to a down converter (DnC) 304 that converts received GPS signals to baseband. In an exemplary implementation, the digital BB processor 124 outputs an LNA control signal 306 that is used by the receiver 212 to select either the LNA 126 or the LNA 302 to provide an amplified signal for down conversion. For example, in non-bypass mode, the LNA control signal 306 indicates that the LNA 216 is to be selected. In bypass mode, the LNA control signal 306 indicates that the LNA 302 is to be selected.

In an exemplary implementation, the output of the IMN2 208 is input to the second LNA 302 of the GPS receiver 212. With this implementation, received signals output from the switch 204 are routed only through IMN2 208 before being input to the LNA 302. Thus, the bypass signal path experiences less signal loss than the bypass signal path shown in FIG. 2 since only IMN2 208 is in the bypath signal path. For example, in FIG. 2, both IMN2 208 and IMN1 210 are in the bypass signal path used during bypass mode operation.

In other embodiments, the front end portion 300 comprises additional circuitry to facilitate GPS signal reception in one or both of the bypass and non-bypass signal paths. For example, in an exemplary implementation, one or more external amplifiers (shown using dashed lines) are used to amplify signals prior to input to the GPS receiver 212. For example, one external amplifier is shown at 314 and is used to amplify a received signal in bypass mode that is then input to the IMN2 208.

The external amplifiers are suitable for use in implementations where the GPS antenna 202 is located far away from GPS receiver 212. In this case, the long conductive traces from the antenna 202 to the receiver 212 may degrade sensitivity. Thus, the external amplifiers amplify the received GPS signal close to the antenna 202 and thereby reduce or eliminate any reduction in sensitivity that might be caused by long signal traces. When using external amplifiers, additional matching networks (not shown) may also be used.

Alternate Switch Implementations

In various implementations, the switch 204 is used to route received signals to either the non-bypass or the bypass signal paths. The switch 204 comprises any suitable switching device having a variety of switch configurations. For example, the switch 204 may be replaced with the switch 312 shown at 310. The switch 312 has little or no insertion loss in the non-bypass signal path and 0.25 dB insertion loss in the bypass signal path. However, such low signal loss does not appreciably affect performance, and therefore virtually any switch configuration may be used to achieve the desired improvements described herein.

Phase Adjustment

In various implementations, the switch 204 is used to route received signals to either the non-bypass or the bypass signal paths. When selecting between the non-bypass and bypass signal paths, a slight time delay between the signal paths may be experienced. This time delay may interfere with the digital BB processor 124 in its attempt to determine an accurate position from the received GPS signals.

To prevent interference with the position determination process, the digital BB processor 124 comprises a delay compensator (DC) 308 that stores delay information associated with the non-bypass and bypass signal paths. The delay compensator 308 comprises a processor, memory, registers or other functional elements (not shown) that operate to compensate for time delays associated with the bypass and non-bypass signal paths. For example, the delay information can be determine at manufacture and loaded into delay compensator 308 at that time. The delay compensator 308 uses the delay information to compensate for any signal time delays that may occur as a result of switching between the non-bypass and bypass signal paths. For example, when the digital BB processor 124 sets the switch control signal 214 to control the switch 204 to route received signals to the bypass signal path, the digital BB processor 124 receives the appropriate delay information provided by the delay compensator 308 to process GPS signals received on the bypass signal path to compensate for a first time delay so that accurate position determinations can be made. A similar process is performed when the digital BB processor 124 switches the received signals to the non-bypass signal path to compensate for a second time delay. As a result, the delay compensator 308 and the digital BB processor 124 can seamlessly compensate or correct for any time delays that may occur each time the receive GPS signals are routed between the non-bypass and bypass signal paths.

Figure 4:
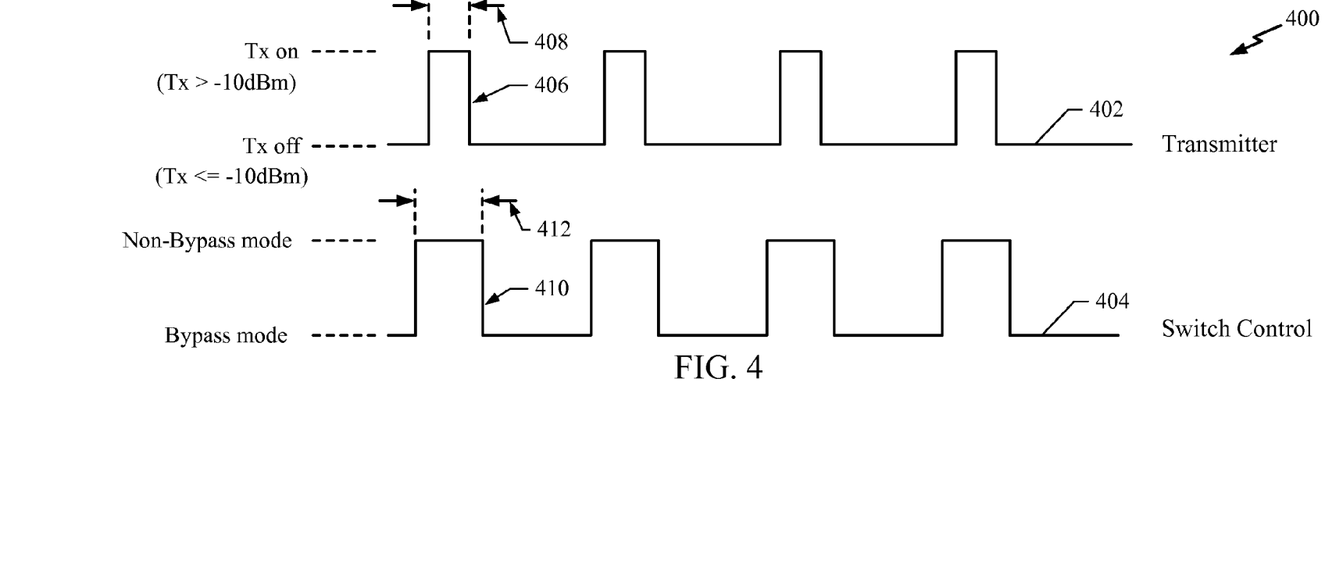
FIG. 4 shows an exemplary timing diagram illustrating the operation of the front end portion shown in FIG. 3 in a time division transmission environment.

FIG. 4 shows an exemplary timing diagram 400 illustrating the operation of the front end portion 300 shown in FIG. 3 in a time division transmission environment. For example, it will be assumed that the transmitter 102 and related receiver 104 are communicating with a communication network utilizing a time division communication protocol, such as GSM, time division long term evolution (TD-LTE), Bluetooth or Wireless LAN. In such a protocol, the transmitter 102 transmits signals during known time intervals.

The diagram 400 comprises a plot 402 of transmission time intervals associated with the transmitter 102. For example, a first transmission interval 406 is shown during which the transmitter 102 is transmitting signals at a high power level. For example, the high power level is defined to be greater than −10 dBm. The duration of the transmission is indicated at 408.

The digital BB processor 124 knows about the operation of the transmitter 102 and during the transmission intervals shown in the plot 402, the digital BB processor 124 outputs the switch control signal 214 to control the switch 204 to select the non-bypass signal path (non-bypass mode) during high power transmission intervals and select the bypass signal path (bypass mode) during low power transmissions intervals or between the transmission intervals when there are no transmissions. For example, a transmission threshold is defined (i.e., −10 dBm) where transmissions above this threshold are considered high power transmissions, and transmissions below this threshold are considered low power transmissions. Thus, the plot 404 shows the mode selected during each transmission interval and the mode selected between transmission intervals. For example, just before the start of the transmission interval 406, the non-bypass mode is enabled as indicated at 410. The non-bypass mode continues (time interval 412) until the transmission interval 406 is completed, at which time the mode is switched to the bypass mode until the next transmission interval where the transmission power level is greater than −10 dBm. Thus, the digital BB processor 124 operates to control the mode selection based on the transmission power levels.

Figure 5:
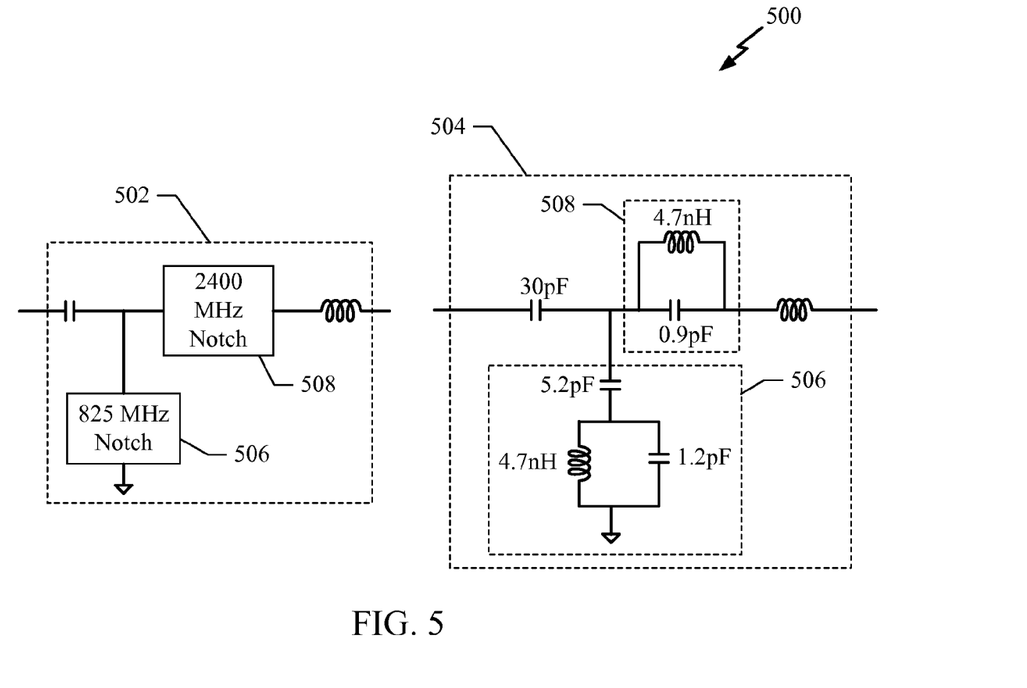
FIG. 5 shows an exemplary input matching network (IMN)

FIG. 5 shows an exemplary input matching network (IMN) 500. For example, the IMN 500 is suitable for use as the IMN2 208 shown in FIG. 3. In an exemplary implementation, the IMN 500 performs both the impedance matching function and operates as a notch filter. For example, during the bypass mode when no jammer or a low power jammer is present, it is desirable that the IMN 600 have a broad pass band to allow GPS signals to be received with the highest sensitivity. However, during bypass mode it is also possible that other transmissions may be present. For example, typical WAN transmissions occur at approximately 825 MHz and typical WLAN transmissions occur at 2400 MHz. It is possible that such transmissions, if not filtered will saturate the GPS receiver. For example, high energy WLAN transmissions (i.e., about +22 dbm) are received with a signal power of about +12 dbm which will saturate the GPS receiver, Furthermore, if both WAN and WLAN frequencies are present, they may produce $2^{nd}$ order distortions that would appear at or near the GPS center frequency of 1575 MHz. It is therefore desirable to filter out energy at these frequencies to avoid saturating the GPS receiver and to avoid any $2^{nd}$ order distortions that may appear in the GPS frequency band.

The diagram 502 shows a configuration of the IMN 500 that provides a notch filter 506 at WAN frequencies and a notch filter 508 at WLAN frequencies, which operate to prevent interference with GPS signal processing during operation in bypass mode. The diagram 504 shows exemplary implementations of the notch filter 506 and the notch filter 508 that perform the notch filtering functions.

In an exemplary implementation, the notch filter 506 comprises a 4.7 nH inductor connected in parallel with a 1.2 pF capacitor. This parallel combination is connected to a 5.2 pF capacitor. The notch filter 508 comprises a 4.7 nH inductor connected in parallel with a 0.9 pF capacitor. It should be noted that the implementations of the filters 506 and 508 are exemplary and that other filter implementations are possible. The filtering characteristics of the notch filters 506 and 508 are provided below. It should be noted that the filter 506 is not limited to the filtering characteristics shown in FIG. 6 and may in fact be configured to filter any type of unwanted signals.

Figure 6:
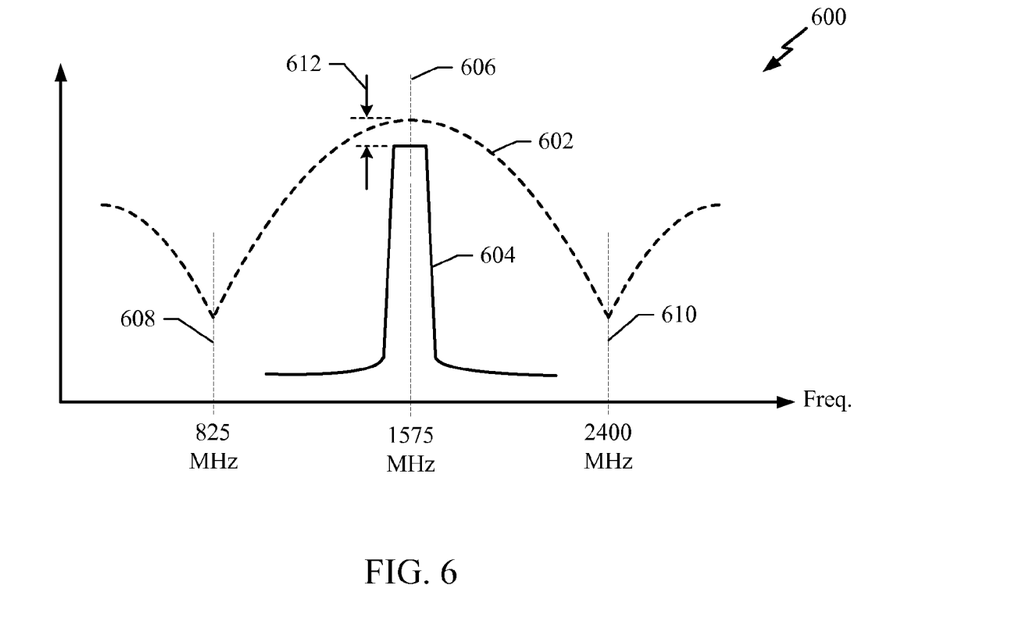
FIG. 6 shows a graph illustrating filtering characteristics of the IMN shown in FIG. 5.

FIG. 6 shows a graph 600 illustrating filtering characteristics of the IMN 600 shown in FIG. 6. For example, the plot 602 illustrates the passband of the IMN 600. At the GPS center frequency of 1575 MHz, indicated at 606, the IMN 600 provides very little signal attenuation. At the WAN center frequency of 825 MHz, indicated at 608, and the WLAN center frequency of 2400 MHz, indicated at 610, the IMN 600 provide significant signal attenuation (i.e., approximately 20 dB). For comparison, the plot 604 shows the pass band characteristics of the SAW filter 206. As indicated at 612, the SAW filter 206 has an insertion loss of about 1.5 dB. Thus, the IMN 600 performs the functions of impedance matching and notch filtering to facilitate the use of bypass mode during which the GPS receivers shown in FIG. 2 and FIG. 3 operate with improved sensitivity.

Figure 7:
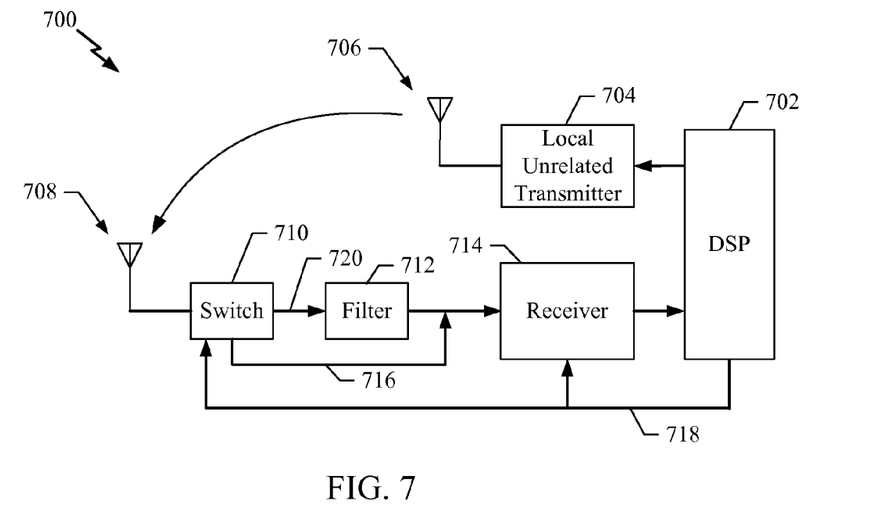
FIG. 7 shows a diagram of an exemplary front end comprising a receiver that operates with improved sensitivity.

FIG. 7 shows a diagram of an exemplary front end 700 comprising a receiver 714 that operates with improved sensitivity. For example, the receiver 714 may be a positioning system receiver. The front end 700 is suitable for use in a portable device comprising multiple transceivers to communicate using multiple transmission technologies. For example, the device may comprise cellular, LAN, WLAN or other transceivers and it is desirable that receivers at the device operate with the highest sensitivity.

Typically receivers comprise input filtering that filter unwanted signals from jamming the receiver. However, when such jammers are not present or present at very low power levels, the input filtering may be unnecessary, and may in fact, insert loss into the signal path that reduces sensitivity. The front end 700 overcomes these and other deficiencies.

The front end 700 comprises digital signal processor (DSP) 702, antenna 706, antenna 708, switch 710, filter 712, and local unrelated transmitter 704 that is unrelated to receiver 714. It will be assumed that the front end 700 operates at a device that comprises multiple transmitters, and for clarity, the unrelated transmitter 704 represents just one of the other transmitters. Accordingly, the operation of the front end 700 with respect to the unrelated transmitter 704 is applicable to the other transmitters that may be present.

DSP 702 outputs signals to be transmitted by the unrelated local transmitter 704 and these signals are transmitted using the antenna 706. The transmitted signals may be received by the antenna 708, which is designed to receive signals for processing by the receiver 714. The switch 710 routes signals received by the antenna 708 on a non-bypass signal path 720 to the filter 712 where undesirable signals are filtered out. For example, the filter 712 may be a SAW filter that has some significant level of insertion loss, for example 1 to 3 dB. The output of the filter 712 is input to the receiver 714 for down conversion. The resulting BB signal is input to the DSP 702 for processing.

Unfortunately, if no jamming signals or only low power jamming signals are present in the signals received by the antenna 708, the filtering performed by the filter 712 may not be needed but its insertion loss will still reduce the sensitivity of the receiver 714. In an exemplary implementation, the DSP 702 knows when and at what power levels unrelated transmissions by the unrelated transmitter are to occur. During time intervals when there are no unrelated transmissions or only low power unrelated transmissions, the DSP 702 outputs a control signal 718 to the switch 710 causing the switch 710 to route received signals around the filter 712 on a bypass signal path 716, thereby bypassing the filter 712 and avoiding its insertion loss. The received signals are received at the receiver 714 with the highest possible signal levels resulting in increased receiver sensitivity.

In various implementations, the DSP 702 can set the control signal 718 based on unrelated transmissions from any unrelated transmitter operating at the device. Not only does the control signal 718 control the operation of the switch 710, but it may also control the operation of the receiver 714. For example, the receiver 714 may select a different input configuration based on the control signal 718. For example, the receiver 714 utilizes one configuration if the filter 712 is not bypassed and another configuration if the filter 712 is bypassed.

The DSP 702 may also perform additional functions based on the status of the control signal 718. For example, the DSP 702 may comprise one or more parameters that are used to process the signals provided by the receiver 714. The DSP 702 can adjust or select from the various parameters based on the status of the control signal 718. For example, if the filter 712 is not bypassed, one set of parameters are used by the DSP 702 to process the received data, for instance to compensate for a first time delay. If the switch 710 is set to bypass the filter 712, another set of parameters are used by the DSP 702 to process the received data, for instance to compensate for a second time delay.

Therefore, the front end 700 comprises a receiver 714 that operates with improved sensitivity in a device that can include any number of unrelated local transmitters transmitting information using any type of transmission protocol.

Figure 8:
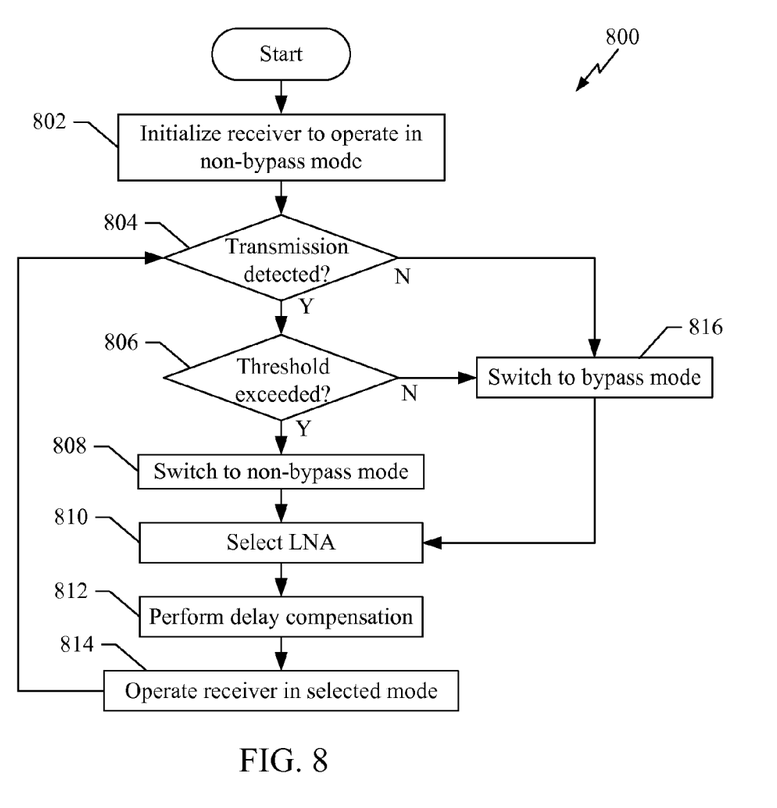
FIG. 8 shows an exemplary method for operating a receiver to achieve improved sensitivity.

FIG. 8 shows an exemplary method 800 for operating a receiver to achieve improved sensitivity. For example, in one implementation, the operations of the method 800 are performed by the front end 300 comprising the GPS receiver 212 shown in FIG. 3.

At block 802, the receiver is initialized to operate in non-bypass mode. For example, the digital BB processor 124 sets the switch control signal 214 to control the switch 204 to route received signals to the SAW filter 206 on the non-bypass signal path to the receiver 212.

At block 804, a determination is made as to whether a transmission (jammer) from a local unrelated transmitter is detected. For example, the digital BB processor 124 knows when transmissions from the transmitter 102 are to occur. If a transmission is to occur, the method proceeds to block 806. If no transmission is to occur, the method proceeds to block 816.

At block 806, a determination is made as to whether the detected transmission is above a power level threshold. For example, the digital BB processor 124 knows the power level of transmissions from the unrelated local transmitter 102. If the transmitted power level is to exceed a selected threshold (i.e., −10 dBm), the method proceeds to block 808. If the power level of the transmission is equal to or below the threshold, the method proceeds to block 816.

At block 816, a bypass operating mode is selected. For example, the digital BB processor 124 sets the switch control signal 214 to control the switch 204 to route signals on a bypass signal path that avoids the SAW filter 206. In this configuration, the signals are received at the receiver 212 with the highest signal level resulting in the improved receiver sensitivity.

At block 808, a non-bypass mode is selected. For example, the digital BB processor 124 sets the switch control signal 214 to control the switch 204 to route signals on a non-bypass signal path that includes the SAW filter 206. In this configuration, the signals are filtered to remove jammers but also experience the insertion loss of the filter. The signals are thereafter received at the receiver 212 with lower signal levels resulting in the lower receiver sensitivity.

At block 810, an LNA at the receiver is selected. For example, in an implementation where the receiver comprises multiple LNAs, the appropriate LNA is selected to receive GPS signals based on the operating mode. For example, referring to FIG. 3, if the non-bypass mode is selected, the receiver 212 enables the LNA 216 to receive the GPS signals based on the LNA control signal 306. If the bypass mode is selected, the receiver 212 enables the LNA 302 to receive the GPS signals based on the control signal 306.

At block 812, delay compensation is performed. For example, the delay compensator 308 and digital BB processor 124 compensate (or correct) for any time delay associated with a particular operating mode. For example, a first time delay associated with the non-bypass operating mode is compensated, or a second time delay associated with the bypass mode is compensated. The compensation (or correction) of the time delays allow the digital BB processor 124 to accurately process the received GPS signals.

At block 814, the receiver is operated in the selected mode and the method returns to block 804 to determine whether or not additional transmissions are detected.

Thus, the method 800 illustrates a method for operating a receiver, such as the GPS receiver included in the front end 300, to achieve improved sensitivity. It should be noted that the method 800 is just one implementation and that the operations of the method 800 may be rearranged or otherwise modified such that other implementations are possible.

Figure 9:
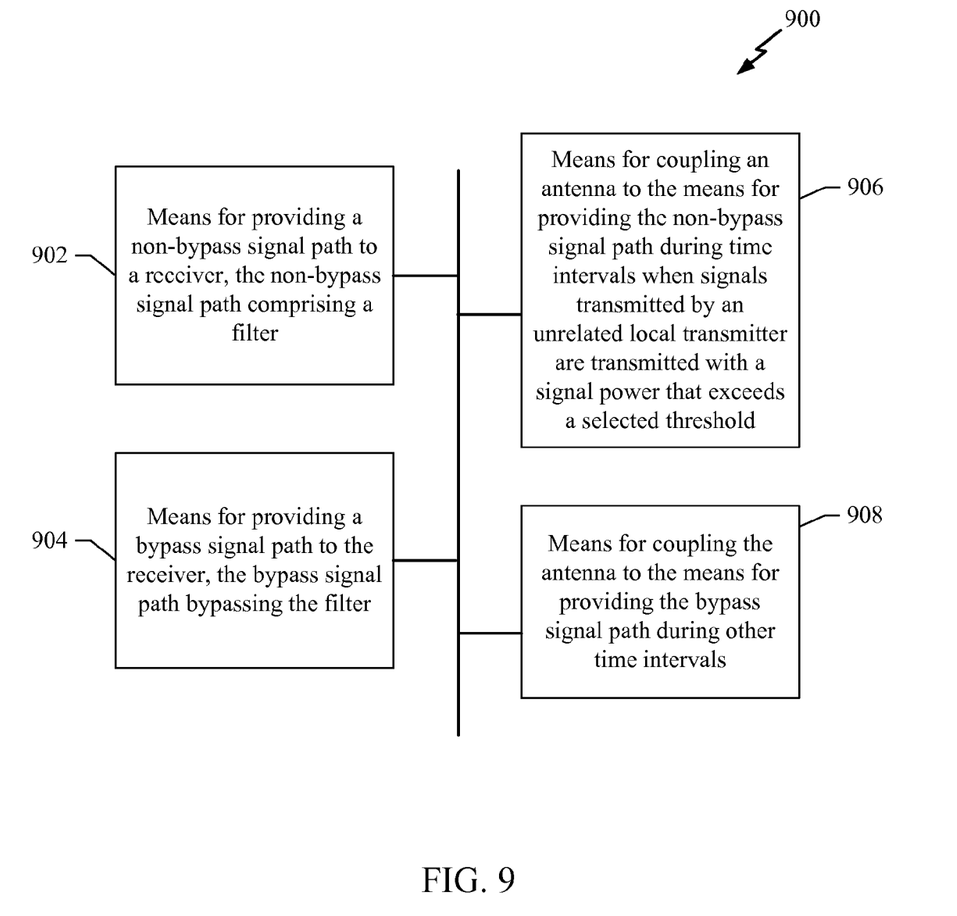
FIG. 9 shows a receiver apparatus configured to achieve improved sensitivity.

FIG. 9 shows a receiver apparatus 900 configured to operate with improved sensitivity. The apparatus 900 is suitable for use in the front end 300 shown in FIG. 3 or in the front end 700 shown in FIG. 7. In an aspect, the apparatus 900 is implemented by one or more modules configured to provide the functions as described herein. For example, in an aspect, each module comprises hardware and/or hardware executing software.

The apparatus 900 comprises a first module comprising means (902) for providing a non-bypass signal path to a receiver, the non-bypass signal path comprising a filter, which in an aspect comprises the signal path 720.

The apparatus 900 also comprises a second module comprising means (904) for providing a bypass signal path to the receiver, the bypass signal path bypassing the filter, which in an aspect comprises the signal path 716.

The apparatus 900 also comprises a third module comprising means (906) for coupling an antenna to the means for providing the non-bypass signal path during time intervals when signals transmitted by an unrelated local transmitter are transmitted with a signal power that exceeds a selected threshold, which in an aspect comprises the switch 710.

The apparatus 900 also comprises a fourth module comprising means (908) for coupling the antenna to the means for providing the bypass signal path during other time intervals, which in an aspect comprises switch 710.

Those of skill in the art would understand that information and signals may be represented or processed using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. It is further noted that transistor types and technologies may be substituted, rearranged or otherwise modified to achieve the same results. For example, circuits shown utilizing PMOS transistors may be modified to use NMOS transistors and vice versa. Thus, the amplifiers disclosed herein may be realized using a variety of transistor types and technologies and are not limited to those transistor types and technologies illustrated in the Drawings. For example, transistors types such as BJT, GaAs, MOSFET or any other transistor technology may be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. An apparatus comprising:
   a non-bypass signal path coupled to a receiver configured to receive positioning signals from a Global Navigation Satellite Systems (GNSS), the non-bypass signal path comprising a filter;
   a bypass signal path coupled to the receiver, the bypass signal path configured to bypass the filter, the bypass signal path comprising at least one input matching network (IMN) configured to provide impedance matching and filtering, the IMN being configured to provide a broader pass band than the filter of the non-bypass filter path, the IMN comprising a first notch filter configured to attenuate a first range of frequencies used for transmitting signals unrelated to the positioning signals associated with at least one non-local transmitter and a second notch filter configured to attenuate a second range of frequencies used for transmitting signals unrelated to the positioning signals and associated with another at least one non-local transmitter, wherein the presence of signals within both the first range of frequencies and the second range of frequencies produce second order distortions within a third frequency range associated with the positioning signals which the receiver is configured to receive;
   a first processor configured to generate a control signal for alternatively routing the received signal through either the non-bypass signal path or the bypass signal path based on whether an expected signal power for transmission signals in the first range of frequencies or the second range of frequencies by an unrelated local transmitter exceeds a selected threshold; and
   a delay compensator, the delay compensator comprising a second processor and a memory, the second processor being configured to access time delay information stored in the memory of the delay compensator and being further configured to select first delay information from the memory to compensate for a first time delay associated with the non-bypass signal path responsive to the control signal from the first processor indicating that the non-bypass signal path has been selected and to select second delay information from the memory to compensate for a second time delay associated with the bypass signal path responsive to the control signal from the first processor indicating that the bypass signal path has been selected, wherein the delay compensator is configured to provide the selected first delay information or second delay information to the first processor, and wherein the first processor, during signal processing for signal determination, is configured to use the first delay information to compensate for delays associated with the non-bypass signal path and to use the second delay information to compensate for delays associated with the bypass-signal path;
   a switch configured to receive the control signal and in response thereto to select the non-bypass path when the expected signal power exceeds the selected threshold and select the bypass path when the expected signal power does not exceed the selected threshold.

2. The apparatus of claim 1, the filter comprising at least one of a SAW filter, a FBAR filter, and a BAW filter.

3. The apparatus of claim 1, the receiver comprising a positioning system receiver.

4. The apparatus of claim 1, the unrelated local transmitter comprising a wide area network (WAN) transmitter.

5. The apparatus of claim 1, the first LNA having an output coupled to an output of the second LNA.

6. The apparatus of claim 1, wherein the filter is configured to filter out signals that are outside of a Global Positioning System (GPS) signal band.

7. The apparatus of claim 1, wherein the processor comprises a baseband processor configured to process positioning signals received via the non-bypass signal path and the bypass signal path and to process communication signals received from a local receiver via a communication signal path.

8. The apparatus of claim 1, wherein the receiver is configured to use a first input configuration in response to the received signal being routed through the non-bypass signal path and to use a second input configuration in response to the received signal being routed through the bypass signal path.

9. An apparatus comprising:
   means for providing a non-bypass signal path to a receiver configured to receive positioning signals from a Global Navigation Satellite Systems (GNSS), the non-bypass signal path comprising a means for filtering;
   means for providing a bypass signal path to the receiver, the bypass signal path configured to bypass the filter, the means for providing the bypass signal path comprising means for providing at least one input matching network (IMN), the means for providing the at least one IMN configured to provide impedance matching and filtering and to provide a broader pass band than the means for filtering of the non-bypass signal path, the means for providing the at least one IMN further comprising a second filtering means and a third filtering means, the second filtering means comprising means for attenuating a first range of frequencies used for transmitting signals unrelated to the positioning signals and associated with at least one non-local transmitter using a first notch filter, the third filtering means comprising means for attenuating a second range of frequencies used for transmitting signals unrelated to the positioning signals and associated with another at least one non-local transmitter using a second notch filter, wherein the presence of signals within both the first range of frequencies and the second range of frequencies produce second order distortions within a third frequency range associated with the positioning signals which the receiver is configured to receive;
   first processing means for generating a control signal for alternatively routing the received signal through either the non-bypass signal path or the bypass signal path based on whether an expected signal power for transmission signals in the first range of frequencies or the second range of frequencies by an unrelated local transmitter exceeds a selected threshold;
   delay compensation means comprising a second processing means and a data storage means, the second processing means being configured to access time delay information stored in the data storage means and being further configured to select first delay information from the data storage means to compensate for a first time delay associated with the non-bypass signal path responsive to the control signal from the first processing means indicating that the non-bypass signal path has been selected and to select second delay information from the data storage means to compensate for a second time delay associated with the bypass signal path responsive to the control signal from the first processing means indicating that the bypass signal path has been selected, wherein the delay compensation means is configured to provide the selected first delay information or second delay information to the first processing means, and wherein first processing means, during signal processing for positioning signal determination, is configured to use the first delay information to compensate for delays associated with the non-bypass signal path and to use the second delay information to compensate for delays associated with the bypass-signal path; and
   means for switching configured to receive the control signal and in response thereto to select the non-bypass path when the expected signal power exceeds the selected threshold and select the bypass path when the expected signal power does not exceed the selected threshold.

10. The apparatus of claim 9, the filter comprising at least one of a SAW filter, a FBAR filter, and a BAW filter.

11. The apparatus of claim 9, the receiver comprising a positioning system receiver.

12. The apparatus of claim 9, the unrelated local transmitter comprising a wide area network (WAN) transmitter.

13. A method comprising:
   generating, using a first processor, a control signal for alternatively routing a received signal through either a non-bypass signal path or a bypass signal path based on whether the expected signal power for transmission signals by the unrelated local transmitter exceeds a selected threshold, wherein the unrelated local transmitter is unrelated to a local receiver configured to receive positioning signals from a Global Navigation Satellite Systems (GNSS);
   switching based on the control signal and in response thereto selecting the non-bypass path when the expected signal power exceeds the selected threshold and selecting the bypass path when the expected signal power does not exceed the selected threshold;
   matching an impedance of using an input matching network (IMN) and filtering, the IMN comprising a first notch filter configured to attenuate a first range of frequencies used for transmitting signals unrelated to the positioning signals and associated with at least one non-local transmitter and a second notch filter configured to attenuate a second range of frequencies used for transmitting signals unrelated to the positioning signals and associated with another at least one non-local transmitter, wherein the presence of signals within both the first range of frequencies and the second range of frequencies produce second order distortions within a third frequency range at which the receiver is configured to receive a signal, the IMN providing a broader pass band than a filter of the non-bypass signal path;
   obtaining time delay information from a delay compensator comprising a second processor and a memory, wherein obtaining the time delay information further comprises accessing the time delay information stored in the memory with the second processor, and selecting first delay information from the memory to compensate for a first time delay associated with the non-bypass signal path responsive to the control signal indicating that the non-bypass signal path has been selected, and selecting second delay information from the memory to compensate for a second time delay associated with the bypass signal path responsive to the control signal indicating that the bypass signal path has been selected,
   compensating for the first time delay or the second time delay, during signal processing for positioning signal determination, using the first delay information to compensate for delays associated with the non-bypass signal path or the second delay information to compensate for delays associated with the bypass-signal path;

attenuating a range of frequencies associated with at least one non-local transmitter and the another at least one non-local transmitter.

14. The method of claim 13, further comprising filtering out the selected signals on the non-bypass signal path that are transmitted by the unrelated local transmitter with the expected signal power that exceeds the selected threshold.

15. The method of claim 13, further comprising:
enabling the first LNA to amplify a first received signal carried on the non-bypass signal path; and
enabling the second LNA of the receiver to amplify a second received signal carried on the bypass signal path.

16. The method of claim 13, further comprising filtering the non-bypass signal path with a notch filter to filter at least one unwanted signal.

\* \* \* \* \*